(No Model.)
G. W. BUSHAW.
CHURN.
No. 468,762. Patented Feb. 9, 1892.
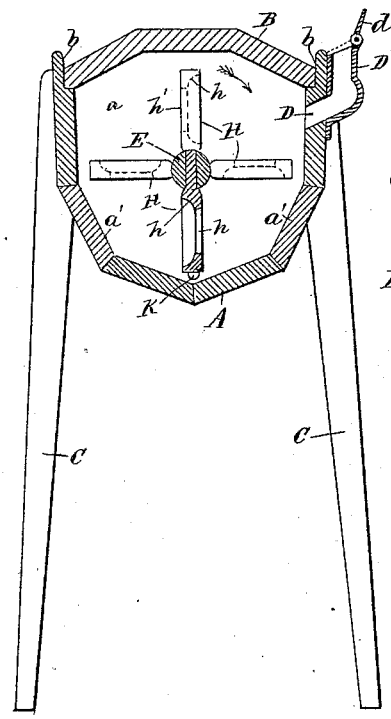
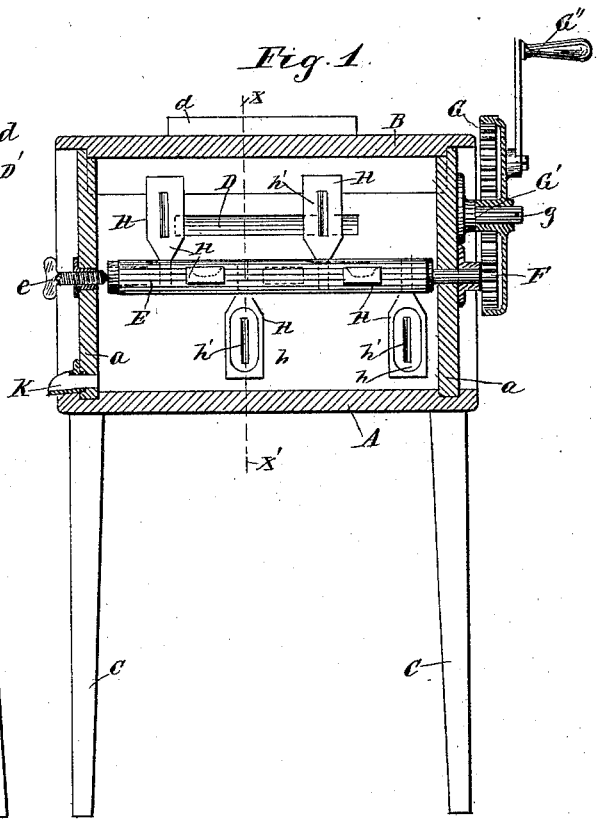
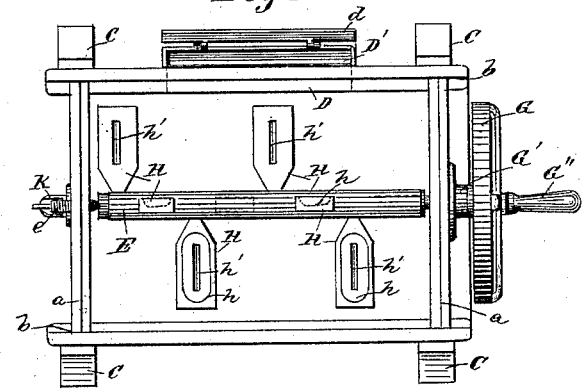
Witnesses.
E. F. Elmore
A. H. Opsahl
Inventor.
George W. Bushaw
By his Attorney.
Jas. F. Williamson

UNITED STATES PATENT OFFICE.

GEORGE W. BUSHAW, OF LONG LAKE, ASSIGNOR OF ONE-HALF TO HAVILAH M. CURTIS, OF MINNEAPOLIS, MINNESOTA.

CHURN.

SPECIFICATION forming part of Letters Patent No. 468,762, dated February 9, 1892.

Application filed July 25, 1891. Serial No. 400,710. (No model.)

*To all whom it may concern:*

Be it known that I, GEORGE W. BUSHAW, a citizen of the United States, residing at Long Lake, in the county of Hennepin and State of Minnesota, have invented certain new and useful Improvements in Churns; and I do hereby declare the following to be a full, clear, and exact description of the invention, such as will enable others skilled in the art to which it appertains to make and use the same.

My invention has for its object to provide an efficient churn of simple construction and quick action.

To this end I make the churn-barrel of polygonal form, equip the beater-shaft with a series of beater-blades, each of which has a concave face and a slit at the back or bottom of the concavity, and provide an air-inlet of comparatively large size through one wall of the barrel, so located as to deliver the air into the path of the beaters. The air-inlet is in the form of an elongated slot, and in communication with the same fixed to the exterior of the barrel is an air chest or chute having its mouth above the cream-level. In virtue of this construction of the beater-blades and the relation of the air-inlet to the same, they give both an improved mechanical action or agitation and force into the cream a larger quantity of air. The beater-shaft is revolved at a high rate of speed from suitable multiplying gearing. The concave faces of the beater-blades when thus in rapid motion will catch the air and carry it into the cream with something of an injector action, and the cream will force itself backward along with the air through the slit in the blade, thus giving a highly efficient mechanical action. The mechanical action is further improved by the polygonal form of the churn-barrel, which is thereby made by its angles to give a series of breaks to the sweep of the cream under the action of the beaters.

The churn is illustrated in the accompanying drawings, wherein, like letters referring to like parts throughout, Figure 1 is a longitudinal central section of the churn. Fig. 2 is a cross-section of the same on the line X X' of Fig. 1, and Fig. 3 is a plan of a churn with the top removed.

A is the body, B the cover, and $a$ the end walls, constituting the churn-barrel. C are the supporting-legs for the same. The periphery of the churn-barrel is made up of a series of flat strips or staves $a'$, making the barrel of polygonal form.

The cover B is removable, resting in rabbeted seats $b$ on the churn-barrel.

D is an elongated slot through one of the side walls of the churn-body, and D' is the housing of the same, fixed to the exterior of the churn-barrel, and constituting the air-chest. The mouth of the air-chest is above the cream-level in the churn and is provided with a pivoted flap or lid $d$, which is left open when the churn is in action.

E is the beater-shaft, journaled at one end and held by a centering-piece $e$ at the other. The shaft E has a pinion $f$ on the outer end of its journal, which engages with an internal gear G on a crank-disk G'. The disk G' is sleeved on a stud $g$, projecting from the end wall of the churn and is provided with a crank-handle G''.

H H are the series of beater-blades, having the concave faces $h$ and the slit $h'$.

K is the discharge-passage, located at one end of the churn body.

The operation of the parts has already been described.

By actual experience I have found that even in extremely hot weather butter may be obtained with this churn in less than two minutes.

What I claim, and desire to secure by Letters Patent of the United States, is as follows:

The combination, with a churn-body provided with an elongated slot through one of its side walls, of an air chute or chest continuous with said slot and having an open mouth above the cream-level, a beater-shaft, and a series of beater-blades carried by the shaft, each of which has a concave face and a slit at the back or bottom of the concavity; substantially as described.

In testimony whereof I affix my signature in presence of two witnesses.

GEORGE W. BUSHAW.

Witnesses:
JAS. F. WILLIAMSON,
EMMA F. ELMORE.